US005712357A

United States Patent [19]
Basset et al.

[11] Patent Number: 5,712,357
[45] Date of Patent: Jan. 27, 1998

[54] METHOD FOR METATHETICALLY PREPARING SULPHUR CONTAINING POLYMERS OR ORGANIC COMPOUNDS

[75] Inventors: Jean-Marie Basset, Villeurbanne; Jean-Luc Couturier, Valleiry; Michel Leconte, Villeurbanne; Jean Ollivier, Arudy, all of France; Katsumi Tanaka, Chofu, Japan

[73] Assignee: Elf Aquitaine, Courbevoie, France

[21] Appl. No.: 835,590

[22] Filed: Apr. 10, 1997

Related U.S. Application Data

[63] Continuation of Ser. No. 362,413, filed as PCT/FR93/00588, Jun. 16, 1993, published as WO94/00426, Jan. 6, 1994, abandoned.

[30] Foreign Application Priority Data

Jun. 26, 1992 [FR] France .................... 92 07898

[51] Int. Cl.⁶ .................... C08F 28/02; C07C 6/04
[52] U.S. Cl. .................... 526/286; 526/104; 526/348; 568/66; 568/67; 568/69; 585/646
[58] Field of Search .................... 526/286, 348, 526/104; 585/646; 568/66, 67, 69

[56] References Cited

U.S. PATENT DOCUMENTS

| | | | |
|---|---|---|---|
| 4,465,890 | 8/1984 | Kukes | 585/646 |
| 4,537,994 | 8/1985 | Roberts | 568/59 |
| 4,654,462 | 3/1987 | Basset | 585/646 |
| 4,837,188 | 6/1989 | Laval | 502/107 |

FOREIGN PATENT DOCUMENTS

| | | |
|---|---|---|
| 0191675 | 8/1986 | European Pat. Off. . |
| 0283400 | 9/1988 | European Pat. Off. . |

OTHER PUBLICATIONS

A. V. Anisimov, et al., "On the Possibility of Metathesis of Diallylsulfide and Diallylsulfone on Heterogeneous Alumiona–Rhenium Catalyst", Chemical Abstracts, vol. 115, No. 23, Dec. 9, 1991, Abstract No. 255485X, p. 796, col. 2.

Jean–Luc Couturier, et al., "A Cyclometalated Aryloxy(chloro)neopentylidenetungsten Complex: A Highly Active and Stereoselective Catalyst for the Metathesis . . .", Angew. Chem. Int. Ed. Engl., vol. 31, No. 5, 1992, pp. 628–631.

Francoise Quignard, et al., "Synthesis and Catalytic Properties of $W(OAr)_2Cl_2(CHCMe_3)(OR_2)$ and $W(OAr)_2Cl(CHCMe_3)(CH_2CME_3)(OR_2)$ . . . ", J. Chem. Soc., Chem. Commun., 1985, pp. 1816–1817.

Coutourier, J.L, Angew. Chem. Int. Ed. Engl., 31 (1992) No. 5 628.

Quignard, F., J. Chem. Soc., (1985) Chem. Commun. 1816.

Primary Examiner—Fred Zitomer
Attorney, Agent, or Firm—Ostrolenk, Faber, Gerb & Soffen, LLP

[57] ABSTRACT

A process for the preparation of organic compounds or polymers containing one or more sulphur atoms and including one or more double bonds in a hydrocarbon chain is described. An acyclic sulphur-containing olefin or an unsaturated sulphur-containing cyclic hydrocarbon undergoes a self metathesis reaction or a cross metathesis reaction with a non-sulphur-containing acyclic olefin or a non-sulphur-containing unsaturated cyclic hydrocarbon to produce novel olefins, novel dienes, and/or olefinic polymers containing one or more sulphur atoms.

17 Claims, No Drawings

METHOD FOR METATHETICALLY PREPARING SULPHUR CONTAINING POLYMERS OR ORGANIC COMPOUNDS

This is a Continuation of application Ser. No. 08/362,413 filed as PCT/FR93/00588, Jun. 16, 1993, published as WO94/00426, Jan. 6, 1994, now abandoned.

The invention concerns a process for the preparation of organic monomers or polymers containing one or more double bonds in a hydrocarbon chain containing one or more sulphur atoms. Unsaturation and the presence of sulphur enables these compounds to be used as intermediates in organic- synthesis and as comonomers, binding agents or cross linking agents, or polymerisation reaction modifiers. Sulphur-containing polymers are of particular interest due to their resistance to solvents, heat and ignition. The invention also concerns novel products produced by the process.

Compounds of this type are difficult to prepare using conventional organic synthesis methods. None of the current technical literature indicates that the metathesis reaction could be applied to acyclic or cyclic olefins containing a sulphur atom in their hydrocarbon chain; see, for example, the general and very complete publication by K. J. Ivin: "Olefin Metathesis", Academic Press, London (1983); the article by J. Otton in "Informations Chimie", No 201 (May 1980), pp 161–168; or the article by J. C. Mol on metathesis of olefins containing functional groups in "Olefin Metathesis and Polymerization Catalysts", (Editors: Y. Imamoglu, B. Zumreoglu-Karan and A. J. Amass), Kluwer Academic Publishers, Dordrecht (1990), pp 115–140). In addition, a number of prior art documents have shown that addition of sulphur-containing organic compounds, in particular organic sulphides, to catalytic metathesis systems can slow down and even completely inhibit metathesis of acyclic olefins (see F. Pennella, "Journal of Catalysis", 69, 206 (1981) and T. Nishigushi, K. Fukuzumi and K. Sugisaki, "Journal of Catalysis", 70, 24 (1981)).

During the course of the work which led to the present invention, we have discovered that metathesis of acyclic and cyclic sulphur-containing olefins is possible using a suitable catalyst, and a whole range of olefinic, polyenic and/or polymeric sulphur-containing compounds can be produced. This reaction can produce these sulphur-containing compounds cost effectively, in a single step, from readily available reactants.

The novel process of the invention is characterised in that an acyclic olefin or unsaturated non aromatic cyclic hydrocarbon, each containing sulphur in its hydrocarbon chain, undergoes a self metathesis reaction or a cross metathesis reaction with a further acyclic olefin or a further unsaturated non aromatic cyclic hydrocarbon which does not contain sulphur, to produce one or more compounds containing one or more double bonds and containing one or more sulphur-atoms.

Acyclic sulphur-containing olefins which can be produced by the process of the invention can be selected from among the many unsaturated hydrocarbons containing at least three carbon atoms, a double bond and a S atom; the process can be applied to a variety of compounds in which the number of C atoms can reach as high as 36 and more; the number of double bonds can reach four or more, and in general one to eight S atoms are present in the molecule.

Among the most widespread applications of the invention are olefinic sulphides, which have the following formula after treatment:

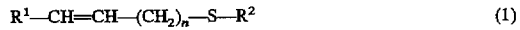  (1)

where $R^1$ and $R^2$, which may be similar or different, are H atoms, $C_1$ to $C_{12}$ alkyl, or $C_2$–$C_{12}$ cycloalkyl or alkenyl, or $C_6$–$C_{18}$ aryl, n being a whole number from 0 to 15.

Other starting materials for the novel process are unsaturated cyclic hydrocarbons containing one to four double bonds and a thioalkyl group. In particular, these are sulphur-containing cyclic olefins of the formula

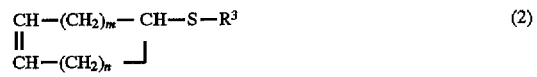  (2)

where m and n, which may be equal or different, are whole numbers from 0 to 15, with m+n other than 0 and other than 3, and $R^3$ is a $C_1$ to $C_{12}$ alkyl or alkenyl group or a $C_6$–$C_{18}$ aryl group. These starting substances can readily be prepared by addition of a thiol to a cyclic diene using the method described in the article by K. Griesbaum, "Angewandte Chemie, International Edition in English", 9, 273 (1970), for example.

Unsaturated acyclic or non aromatic cyclic sulphur-containing hydrocarbons, the starting material for the novel process, can undergo a self metathesis reaction or a cross metathesis reaction with a further unsaturated acyclic or cyclic hydrocarbon which does not contain sulphur.

Suitable unsaturated acyclic hydrocarbons are, for example, olefins of type:

  (3)

where $R^4$ and $R^5$, which may be identical or different, represent a hydrogen atom, a $C_1$ to $C_{18}$ alkyl group, a $C_2$ to $C_{18}$ alkenyl group or a $C_6$–$C_{18}$ aryl group.

The unsaturated cyclic hydrocarbons most frequently contain one to four double bonds and are represented by the following general formula:

  (4)

where x is 1 or 2 and p is a whole number equal to 2, 3 or 5 to 15; the cycle may be polycyclic and include a bridge. Preferred examples are cyclopentene, cyclooctene, cyclodecene, cyclododecene, cyclooctadiene, cyclododecadiene, cyclododecatriene or cyclooctatetraene, polycyclic olefins or dienes, such as norbornene, norbornadiene or dicyclopentadiene, etc.

In a first embodiment of the process of the invention, a sulphur-containing acyclic olefin (1) is reacted by self metathesis to produce an acyclic olefin containing two sulphur atoms with general formula:

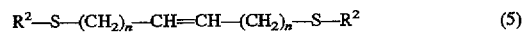  (5)

In a second embodiment of the process of the invention, an unsaturated sulphur-containing cyclic hydrocarbon (2) is reacted by self metathesis to produce a sulphur-containing unsaturated acyclic polymer with the following repeating unit:

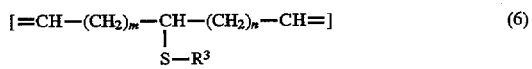  (6)

In a third embodiment of the process of the invention, an acyclic sulphur-containing olefin (1) is reacted by cross metathesis with an acyclic olefin (3) to produce novel sulphur-containing acyclic olefins with formulae:

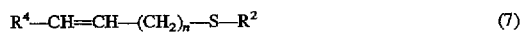  (7)

and

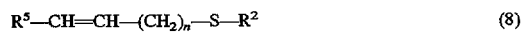  (8)

In a fourth embodiment of the process of the invention, an acyclic sulphur-containing olefin (1) is reacted in a cross. metathesis reaction with an unsaturated cyclic hydrocarbon (4) to produce sulphur-containing acyclic dienes with formulae:

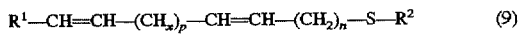

and

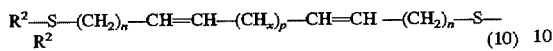

In a fifth embodiment of the process of the invention, an unsaturated sulphur-containing cyclic hydrocarbon (2) is reacted in a cross metathesis reaction with an acyclic olefin (3) to produce the following sulphur-containing acyclic dienes:

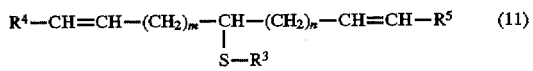

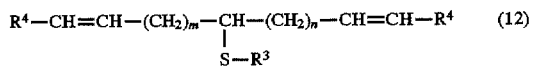

and

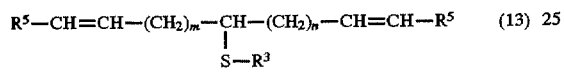

In a sixth embodiment, an unsaturated sulphur-containing cyclic hydrocarbon (2) is reacted in a cross metathesis reaction with an unsaturated cyclic hydrocarbon (4) to produce an unsaturated acyclic sulphur-containing polymer with the following repeating unit:

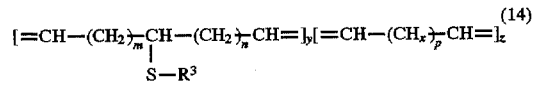

where y and z, which may be identical or different, are numbers between 300 and 2 000, in particular between 500 and 1 500.

As is known, metathesis requires a catalyst. The various embodiments of the process of the invention can use known catalysts. The catalysts described in the following publications may, for example, be used: FR-A-2 547 513, FR-A-2 577 216 and FR-A-2 612 422.

Tungsten based catalysts are particularly suitable, in particular catalysts constituted by diphenoxy carbene complexes of tungsten with general formula:

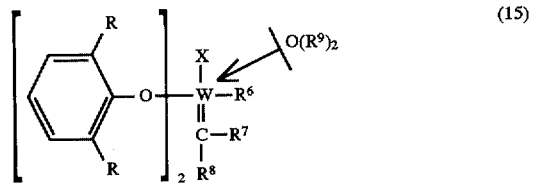

where X represents a halogen, R represents a hydrocarbon group or an electronegative atom, $R^6$ represents an alkyl or aryl group or a halogen, $R^7$ and $R^8$ represent hydrogen atoms or alkyl radicals, and $R^9$ represents an alkyl radical. These catalysts and their preparation are described in FR-A-2 577 216.

In particular, X is a chlorine atom, R is a $C_1$ to $C_6$ alkyl group, an aryl group or a Cl, Br or F atom, $R^6$ is a neopentyl —$CH_2$—$C(CH_3)_3$ group or a chlorine atom, $R^7$ is a tertiobutyl —$C(CH_3)_3$ group, $R^8$ is a hydrogen atom and $R^9$ is an ethyl —$CH_2CH_3$ group or an isopropyl —$CH(CH_3)_2$ group.

Surprisingly, however, metathesis involving sulphur compounds can be considerably improved by using certain catalysts which are a variation on type (15) described above. These novel tungsten catalysts are characterised in that the R groups are aryl groups, one of which is directly bonded to the W atom. They can be represented by the following structure:

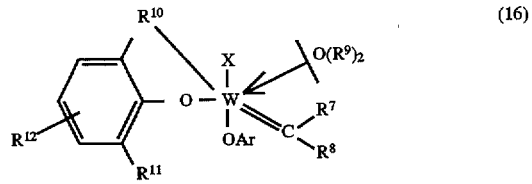

In this complex, groups $R^{10}$, $R^{11}$ and/or $R^{12}$ are aryl groups, and $R^{11}$ and $R^{12}$ may not be present; the latter, which may be similar or different, represent, for example, phenyl, tolyl, xylyl, mesityl, naphthyl or other groups. $R^{10}$, bonded to the hexavalent tungsten atom and to the aryloxy group nucleus, may for example be a phenylenyl, tolylenyl, xylylenyl, mesitylenyl, etc. radical. In addition, W carries a second aryloxy (OAr) group, the aryl group of which can be selected from those cited above.

Radicals $R^7$ to $R^9$ have been defined above with reference to catalysts (15).

Example 1 of FR-A-2 577 216 cited above describes the preparation of catalysts (15): 1.5 mole of an organomagnesium compound $MgR_2$ (R=alkyl) is reacted with 1 mole of $Cl_4W$—[O—Ar]$_2$ precursor in ethereal solution. If the aryloxy group of the precursor includes at least one aryl substituent in the ortho position to the oxygen atom, and only 1 mole of $MgR_2$ is used, the complex obtained has structure (16) given above and in general produces greatly improved results for olefin metathesis.

It is remarkable that fairly small modifications to the composition and preparation of the catalyst makes a very significant industrial impact; this indicates a large inventive step which will become more apparent from the following description, particularly Example 1.

Preferred catalysts (16) can also be readily prepared by reaction, in diethyl ether, between the alkylidyne tungsten compound $W(CC(CH_3)_3)Cl_3$ (dimethoxyethane) (the preparation is described in the article by R. R. Schrock, J. Sancho and S. F. Pedersen, "Inorganic Syntheses", 26, 44 (1989), and of lithium 2,6-diphenyl phenate.

Metathesis catalysts with general formula (15) or (16) can be used alone and in association with a Lewis acid co-catalyst such as an organometallic compound or a halide of Ga, Al, Sn, Pb, Mg, Li, Ti or B.

The metathesis reaction is carried out in the absence of a solvent or in a solvent which may be an aromatic or a saturated hydrocarbon. Preferred solvents are chlorobenzene, bromobenzene, benzene or toluene.

The metathesis reaction can be carried out at a temperature of 0° C. to 100° C., preferably between 20° C. and 80° C.

The molar ratio of unsaturated sulphur-containing acyclic or cyclic hydrocarbon/tungsten based catalyst is in general between 10 and 10 000, preferably between 10 and 500 for acyclic sulphur-containing compounds and between 100 and 1 000 for cyclic sulphur-containing compounds. For cross metathesis reactions, the best molar ratio of unsaturated non-sulphur-containing hydrocarbon/unsaturated sulphur-containing hydrocarbon is between 0.2 and 10.

The invention is illustrated by the following non-limiting examples. Unless otherwise indicated, the catalyst has formula (16) where: X is Cl, $R^7$ is tertiobutyl —$C(CH_3)_3$, $R^8$ is H, $R^9$ is ethyl, $R^{10}$ is phenylene, $R^{11}$ is phenyl, $R^{12}$ is not present, and OAr is 2,6-diphenyl-1-phenoxy.

EXAMPLE 1

Self metathesis of allyl methyl sulphide

This reaction produced ethylene and an acyclic olefin disulphide in accordance with the following chemical equation:

$$2\ CH_2=CH-CH_2-S-CH_3 \rightarrow CH_2=CH_2 + CH_3-S-CH_2-CH=CH-CH_2-S-CH_3$$

22 mg, i.e. $2.6 \times 10^{-5}$ mole, of catalyst (16) was introduced into a batch reactor which had been purged with argon, followed by 5 ml of chlorobenzene as solvent. The reactor was stirred and heated to 80° C. 0.056 ml, i.e. $5.2 \times 10^{-4}$ mole, of allyl methyl sulphide was then introduced. After a certain reaction time, the liquid and gaseous phases were analysed to determine the allyl methyl sulphide conversion and the yields of ethylene and olefin disulphide, identified and characterised by combined gas phase chromatography and mass spectrometry (M=148). After 10 hours of reaction, 40% of the allyl methyl sulphide had been converted and the yields of ethylene and of disulphide olefin were each equal to 20%.

An identical operation carried out using a catalyst in which $R^{10}$ and $R^{11}$ were tertiobutyl groups required 20 hours for 10% conversion and gave an ethylene yield of 5%.

EXAMPLES 2 TO 17

Self metathesis of alkyl thiocyclooctenes

This reaction produced sulphur containing olefin polymers in accordance with the following chemical equation:

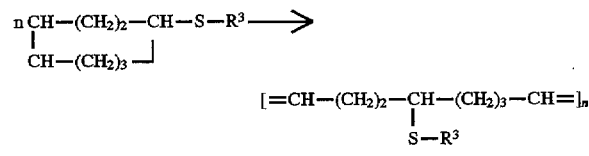

22 mg, i.e. $2.6 \times 10^{-5}$ mole, of catalyst (16) was introduced into a batch reactor which had been purged with argon, followed by the alkyl thiocyclooctene, either in pure form or in solution in 5 ml of chlorobenzene. The general formula for the alkyl thiocyclooctenes used is given in the equation above, and the nature of groups $R^3$ is listed in Tables 1 and 2 below. The quantity of alkyl thiocyclooctene introduced is also given in Tables 1 and 2 and expressed as the alkyl thiocyclooctene/catalyst molar ratio. The reactor was stirred and the polymerisation reaction was carried out at either 20° C. or 80° C. When polymerisation was carried out in the presence of a solvent, the starting alkyl thiocyclooctene conversion was analysed after the reaction times shown in Table 1. When polymerisation was carried out in the absence of a solvent, the reaction was allowed to progress for the time shown in Table 2, and then the polymer was recovered and weighed to determine the reaction yield expressed as the weight of polymer obtained with respect to the weight of alkyl thiocyclooctene introduced. The results are shown in Table 2. The structure of the polymers obtained, the general formula for which is given in the equation above, was verified by elemental chemical analysis and by analysis of their proton and carbon 13 nuclear magnetic resonance spectra.

TABLE 1

Polymerisation, by metathesis in the presence of a solvent, of alkyl thiocyclooctenes with general formula:

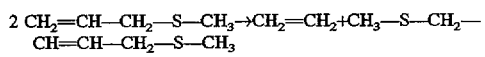

| Ex. No. | $R^3$ | Reaction temperature | (2)/W | Reaction time | Conversion |
|---|---|---|---|---|---|
| 2 | Et | 20° C. | 100 | 200 min | 97% |
| 3 | n-Bu | 20° C. | 100 | 120 min | 97% |
| 4 | t-Bu | 20° C. | 100 | 10 min | 99% |
| 5 | Hex | 20° C. | 100 | 100 min | 99% |
| 6 | cyclo-Hex | 20° C. | 100 | 30 min | 97% |
| 7 | Et | 80° C. | 100 | 10 min | 97% |
| 8 | n-Bu | 80° C. | 100 | 10 min | 97% |
| 9 | t-Bu | 80° C. | 500 | 30 min | 96% |
| 10 | cyclo-Hex | 80° C. | 500 | 60 min | 83% |

(2)/W = initial alkyl thiocyclooctene/catalyst molar ratio.
Conversion = converted alkyl thiocyclooctene/initial alkyl thiocyclooctene.

TABLE 2

Polymerisation, by metathesis in the absence of a solvent, of alkyl thiocyclooctenes with general formula:

| Ex. No. | $R^3$ | Reaction temperature | (2)/W | Reaction time | Yield |
|---|---|---|---|---|---|
| 11 | Et | 20° C. | 100 | 2.5 min | 65% |
| 12 | n-Bu | 20° C. | 100 | 2 min | 67% |
| 13 | t-Bu | 20° C. | 100 | 2 min | 65% |
| 14 | Hex | 20° C. | 100 | 3.5 min | 62% |
| 15 | cyclo-Hex | 20° C. | 100 | 2 min | 53% |
| 16 | Et | 20° C. | 500 | 20 min | 51% |
| 17 | n-Bu | 20° C. | 500 | 30 min | 46% |

(2)/W = initial alkyl thiocyclooctene/catalyst molar ratio.
Yield = converted weight of alkyl thiocyclooctene/initial weight of alkyl thiocyclooctene.

The polymers had the following molecular weights $M_p$ and glass transition temperatures $T_G$:

| Example No | $M_p$ | $T_G$ |
|---|---|---|
| 11 | 119 400 | −68° C. |
| 12 | 150 900 | −72° C. |
| 13 | 140 100 | −26° C. |
| 14 | 153 100 | — |
| 15 | 181 800 | — |
| 16 | 176 600 | −74° C. |
| 17 | 196 500 | −80° C. |

EXAMPLES 18 AND 19

Cross metathesis of allyl methyl sulphide with a non-sulphur-containing acyclic olefin This reaction produced novel sulphur-containing olefins in accordance with the following chemical equation:

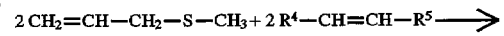

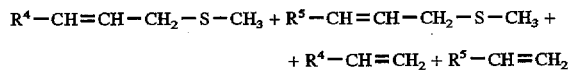

22 mg, i.e. $2.6 \times 10^{-5}$ mole, of catalyst (16) was introduced into a batch reactor which had been purged with argon, followed by 5 ml of chlorobenzene as solvent. The non-sulphur-containing acyclic olefin with general formula $R^4$—CH=CH—$R^5$ was then introduced in the quantity given in Table 3 (expressed as the molar ratio with respect to the catalyst) along with the allyl methyl sulphide, also in the quantity given in Table 3. The reactor was stirred and either left at 20° C. or heated to 80° C. After a certain reaction time, the reaction mixture was analysed and the yields of sulphur-containing products with formulae $R^4$—CH=CH—$CH_2$—S—$CH_3$ and $R^5$—CH=CH—$CH_2$—S—$CH_3$ were determined. Characterisation and identification was carried out using combined gas phase chromatography and mass spectrometry. The results are given in Table 3.

TABLE 3

Cross metathesis between allyl methyl sulphide (1) and an acyclic olefin with formula $R^4$—CH=CH—$R^5$ (3).

| Ex no | 18 | 19 |
|---|---|---|
| $R^4$ | —$CH_3$ | $CH_3$ |
| $R^5$ | —$CH_3$ | —$CH_2CH_3$ |
| (1)/W | 25 | 20 |
| (3)/W | 100 | 20 |
| Reaction temperature | 20° C. | 80° C. |
| Reaction time | 15 h | 15 h |
| $R^4$—CH=CH—$CH_2$—S—$CH_3$ yield | 95% | 30% |
| $R^5$—CH=CH—$CH_2$—S—$CH_3$ yield | — | 20% |

(1)/W or (3)/W = initial olefin/catalyst molar ratio. The yields and products are expressed as the number of moles of product obtained with respect to the number of moles of allyl methyl sulphide introduced.

EXAMPLES 20 to 22

Cross metathesis of allyl methyl sulphide with a non-sulphur-containing cyclic olefin This reaction produced sulphur-containing dienes in accordance with the following chemical equation:

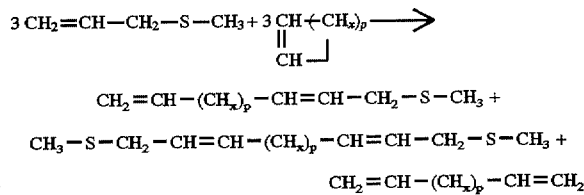

22 mg, i.e. $2.6 \times 10^{-5}$ mole, of catalyst (16) was introduced into a batch reactor which had been purged with argon, followed by 5 ml of chlorobenzene as solvent. The reactor was stirred and either left at 20° C. or heated to 80° C. The allyl methyl sulphide was then added in the quantity shown in Table 4 along with the non-sulphur-containing cyclic olefin which was either cyclopentene (Example 20) or norbornene (Examples 21 and 22), also in the quantity shown in Table 4. After a certain reaction time, the liquid phase was analysed and the allyl methyl sulphide and cyclic olefin conversion was determined. The results are shown in Table 4. The principal products formed were dienes whose chemical formulae are given in the equation above; they were identified and characterised by combined gas phase chromatography and mass spectrometry. These dienes had respective molecular weights of 156, 216 and 96 in the case of cross metathesis with cyclopentene and 182, 242 and 122 in the case of cross metathesis with norbornene.

TABLE 4

Cross metathesis of allyl methyl sulphide (1) with cyclopentene or norbornene.

| Ex No | 20 | 21 | 22 |
|---|---|---|---|
| (1)/W | 25 | 25 | 25 |
| Cyclopentene/W | 25 | — | — |
| Norbornene/W | — | 25 | 100 |
| Reaction temperature | 80° C. | 20° C. | 20° C. |
| Reaction time | 3 h | 30 min | 20 min |
| Conversion of (1) | 30% | 13% | 32% |
| Cyclic olefin conversion | 27% | 99% | 99% |

(1)/W or cyclic olefin/W = initial olefin/catalyst molar ratio.

EXAMPLES 23 to 32

Cross metathesis of butyl thiocyclooctene with a non-sulphur-containing acyclic olefin This reaction produced sulphur-containing acyclic dienes in accordance with the following chemical equation:

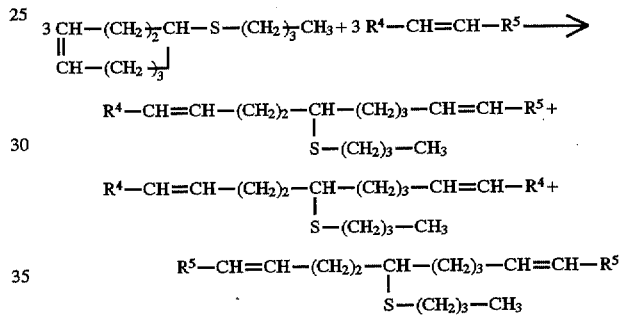

22 mg, i.e. $2.6 \times 10^{-5}$ mole, of catalyst (16) was introduced into a batch reactor which had been purged with argon, followed by 5 ml of chlorobenzene as solvent. The reactor was stirred and either left at 20° C. or heated to 80° C. The butyl thiocyclooctene was then added in the quantity shown in Table 5 along with the acyclic olefin (3), also in the quantity shown in Table 5. After a certain reaction time, the liquid phase was analysed and the conversion of the butyl thiocyclooctene and the yields of sulphur-containing dienes with the general formulae given in the chemical equation above were determined. These sulphur-containing dienes were identified and characterised using combined gas phase chromatography and mass spectrometry.

TABLE 5

Cross metathesis of butyl thiocyclooctene (2) with a non-sulphur-containing acyclic olefin $R^4$—CH=CH—$R^5$ (3).

| Ex No | $R^4$ | $R^5$ | (2)/W | (3)/W | T | t | Conv. | Yield |
|---|---|---|---|---|---|---|---|---|
| 23 | H | H | 25 | 200 | 20° C. | 6 h | 99% | 75% |
| 24 | H | H | 50 | 200 | 20° C. | 15 h | 99% | 72% |
| 25 | H | H | 50 | 400 | 20° C. | 16 h | 88% | 71% |
| 26 | H | H | 100 | 200 | 20° C. | 17 h | 96% | 59% |
| 27 | H | H | 200 | 200 | 20° C. | 8 h | 82% | 39% |
| 28 | H | H | 50 | 200 | 80° C. | 15 min | 93% | 61% |
| 29 | H | H | 50 | 400 | 80° C. | 12 min | 95% | 64% |
| 30 | H | H | 100 | 200 | 80° C. | 10 min | 96% | 33% |

TABLE 5-continued

Cross metathesis of butyl thiocyclooctene (2) with
a non-sulphur-containing acyclic olefin $R^4$—CH=CH—$R^5$ (3).

| Ex No | $R^4$ | $R^5$ | (2)/W | (3)/W | T | t | Conv. | Yield |
|---|---|---|---|---|---|---|---|---|
| 31 | H | $CH_3$ | 50 | 200 | 80° C. | 15 min | 97% | 55% |
| 32 | $CH_3$ | $CH_3$ | 50 | 200 | 80° C. | 15 min | 94% | 52% |

(2)/W and (3)/W = initial butyl thiocyclooctene/catalyst and acyclic olefin/catalyst molar ratios.
T = Reaction temperature.
t = Reaction time.
Conv. = butyl thiocyclooctene conversion.
Yield = Sulphur-containing diene yield = number of moles of sulphur-containing dienes obtained/initial number of moles of butyl thiocyclooctene.

EXAMPLES 33 TO 41

Cross metathesis of butyl thiocyclooctene with a non-sulphur-containing cyclic unsaturated hydrocarbon.

This reaction produced sulphur-containing olefinic polymers in accordance with the following chemical equation:

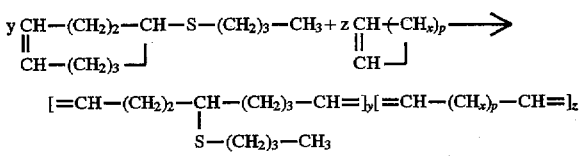

22 mg, i.e. $2.6 \times 10^{-5}$ mole, of catalyst (16) was introduced into a batch reactor which had been purged with argon, followed by the butyl thiocyclooctene and the non-sulphur-containing unsaturated cyclic hydrocarbon in the quantities shown in Table 6. The reactor was stirred and left at room temperature. After a certain reaction time, the polymer formed was recovered and weighed. The polymerisation reaction yield was expressed as the ratio between the weight of polymer obtained and the sum of the weight of sulphur-containing cyclic hydrocarbons and non-sulphur-containing cyclic hydrocarbons introduced. The polymers were characterised by elemental chemical analysis and by analysis of their proton and carbon 13 nuclear magnetic resonance spectra.

TABLE 6

Cross metathesis of butyl thiocyclooctene (2) with a
non-sulphur-containing cyclic unsaturated hydrocarbon (4).

| Ex No | (4) | (2)/W | (4)/W | Reaction time | Yield |
|---|---|---|---|---|---|
| 33 | norbornene | 500 | 500 | 2 min | 60% |
| 34 | norbornene | 100 | 30 | 1 min | 75% |
| 35 | cyclopentene | 100 | 100 | 20 min | 55% |
| 36 | cyclooctene | 100 | 100 | 30 s | 80% |
| 37 | cyclooctadiene | 100 | 100 | 1 min | 70% |
| 38 | cyclododecene | 100 | 100 | 4 min | 55% |
| 39 | cyclododecatriene | 100 | 100 | 3 min | 70% |
| 40 | norbornadiene | 100 | 100 | 30 s | 30% |
| 41 | dicyclopentadiene | 100 | 100 | 2 min | 45% |

(2)/W and (4)/W = initial butyl thiocyclooctene/catalyst and non-sulphur-containing unsaturated cyclic hydrocarbon/catalyst molar ratios.
Yield = weight of polymer obtained/sum of weight of butyl thiocyclooctene and non-sulphur-containing unsaturated cyclic hydrocarbon introduced.

The solid polymers obtained had the following characteristics:

| Example No | $M_p$ | $T_G$ | y/z |
|---|---|---|---|
| 33 | 410 000 | 59° C. | 0.16 |
| 34 | 168 400 | –69° C. | 2.70 |
| 35 | 80 740 | –82° C. | 0.75 |
| 36 | 276 300 | –80° C. | 1.04 |
| 37 | 165 600 | –84° C. | 1.00 |
| 38 | 403 100 | –76° C. | 3.00 |
| 39 | 484 400 | –75° C. | 1.38 |
| 40 | — | –20° C. | — |
| 41 | 385 400 | 58° C. | 0.15 |

Ratio y/z is the ratio between the number of monomer units containing sulphur and the number of monomer units which do not contain sulphur; these ratios were measured in the polymers obtained by elemental analysis and by NMR analysis.

EXAMPLES 42 TO 46

Self metathesis of allyl sulphide

This intramolecular metathesis reaction of allyl sulphide produced ethylene and 2, 5-dihydrothiophene in accordance with the following chemical equation:

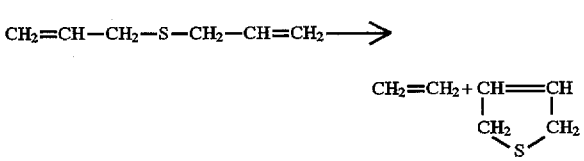

22 mg, i.e. $2.6 \times 10^{-5}$ mole, of catalyst (16) was introduced into a batch reactor which had been purged with argon. The allyl sulphide was then introduced either pure or in solution in 5 ml of chlorobenzene, in a quantity as indicated in the table of results below and expressed as the allyl sulphide/catalyst molar ratio. The reactor was stirred and heated to 50° C. or 80° C.

After a certain reaction time, the liquid phase was analysed and the allyl sulphide conversion and yield of 2,5-dihydrothiophene were determined. The 2,5-dihydrothiophene was characterised by mass spectrometry (M=86) and by proton (100 MHz) and carbon 13 (proton decoupled) (25 MHz) nuclear magnetic resonance in deuterochloroform (chemical displacements in ppm relative to tetramethylsilane):

NMR $^1$H: 5.83 (2 —CH= groups); 3.73 (2 —CH$_2$— groups);

NMR $^{13}$C: 128.4 (2 —CH= groups); 38.8 (2 —CH$_2$— groups).

TABLE 7

Metathesis of allyl sulphide (S) to
2,5-dihydrothiophene (DHT).

| Ex no | S/W | PhCl | Reaction temperature | Reaction time | Conversion of S | DHT yield |
|---|---|---|---|---|---|---|
| 42 | 100 | 5 ml | 50° C. | 3 h | 98% | 85% |
| 43 | 100 | 0 | 80° C. | 8 h | 99% | 90% |
| 44 | 250 | 5 ml | 50° C. | 6 h | 88% | 80% |
| 45 | 250 | 5 ml | 80° C. | 3 h | 98% | 90% |
| 46 | 500 | 5 ml | 80° C. | 2 h | 58% | 55% |

S/W = initial allyl sulphide/catalyst molar ratio.

It can be seen that thiophene derivatives can be produced with excellent yields using the process of the invention.

In general, within the context of the present invention, metathesis of cyclic olefins alone produces acyclic polymers; cross metathesis with acyclic olefins in molecular proportions in the same order produces a mixture of polymer and a novel acyclic olefin (in particular a diene). With an excess of acyclic olefin, a cyclic olefin can produce a novel non-cyclic olefin by ring opening. The invention thus means that the nature of the products can be varied by regulating the proportion of olefins used.

The examples and preceding description demonstrate how various unsaturated compounds containing sulphur atoms bonded to carbon can be prepared using the process of the invention. The principal features of these novel-products can be represented as follows.

Unsaturated monomeric hydrocarbons containing a thio-ether function of the type:

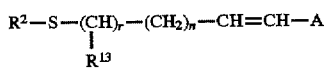

where
$R^2$ has been defined above with respect to formula (1), $R^{13}$ is selected from the same groups as those for $R^2$, r is 1 or 0 and n=0 to 15, while A represents a group such as:

$R^4$— (see formula (3));

$R^2S(CH_2)_n$—;

$R^1$—CH=CH—$(CH_x)_p$— ($R^1$ is as described for formula (1) and can be identical to $R^2$); X is 1 or 2, and p=2 or 3 or 5 to 15;

$R^4$—CH=CH—$(CH_2)_m$— with m=0 to 15; or $R^1$—S—$(CH_2)_n$—CH=CH—$(CH_x)_p$—.

Particular polymers which can be cited are those whose structure contains the following unit:

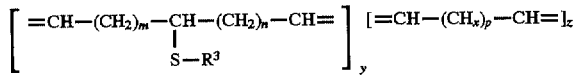

y being generally 300 to 2 000 and z=0 or 300 to 2 000.

COMPARATIVE EXAMPLES

The operations of Example 42 were repeated using other catalysts under the following conditions:

initial allyl sulphide/catalyst molar ratio=100;

5 ml of chlorobenzene as solvent;

reaction temperature 50° C.;

reaction time 3 hours.

Results

|    | Catalyst | Conversion of S | DHT yield |
|----|----------|-----------------|-----------|
| 42 | (16) | 98% | 85% |
| 42a | Catalyst "K" according to European patent EP-A-0 191 675 | 70% | 61% |
| 42b | $Re_2O_7/Al_2O_3$ | 10% | 5% |

EXAMPLES 47 AND 48

Metathesis of allyl sulphide to 2,5-dihydrothiophene (DHT) was carried out using the technique described for Examples 42–46, over a period of 8 hours at 80° C. with 5 ml of chlorobenzene as solvent, the catalyst being

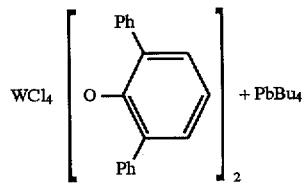

(described in EP-A-0 129 474).

The following results were obtained:

|                | Example 47 | Example 48 |
|----------------|------------|------------|
| Pb/W           | 2          | 2          |
| S/W            | 100        | 50         |
| Conversion of S | 50%       | 90%        |
| DHT yield      | 50%        | 90%        |

We claim:

1. A process for the preparation of organic compounds or polymers containing one or more sulfur atoms, including one or more double bonds in a hydrocarbon chain, by metathesis of an acyclic sulfur-containing olefin or an unsaturated non-aromatic sulfur-containing cyclic hydrocarbon, characterized in that metathesis is carried out in the presence of a tungsten complex catalyst having the structure:

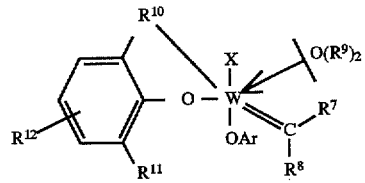

wherein X represents halogen Ar represents an aryl group; —$R^7$ and —$R^8$ independently represent hydrogen atoms or alkyl groups; —$R^9$ represents an alkyl group; —$R^{10}$ represents an aryl group; and —$R^{11}$ and —$R^{12}$ independently represent hydrogen or an arylene group.

2. A process according to claim 1 characterised in that the sulphur-containing compound is reacted in a cross metathesis reaction with an acyclic non-sulphur-containing olefin or an unsaturated non-aromatic non-sulphur-containing cyclic hydrocarbon.

3. A process according to claim 1 characterised in that the sulphur-containing compound is reacted in a self metathesis reaction.

4. A process according to claim 2 characterised in that the sulphur-containing compound is an olefinic cyclic or acyclic sulphide,

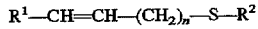

where $R^1$ and $R^2$, which may be similar or different, represent an H atom, a $C_1$ to $C_{12}$ alkyl group, a $C_2$-$C_{12}$ cycloalkyl or alkenyl group or a $C_6$-$C_{18}$ aryl group, n being a whole number from 0 to 10.

5. A process according to claim 4 characterised in that the sulphur-containing acyclic olefin is allyl methyl sulphide.

6. A process according to claim 4 characterised in that the sulphur-containing acyclic olefin is allyl sulphide.

7. A process according to claim 2 characterised in that the unsaturated non-aromatic sulphur-containing cyclic hydrocarbon contains one to four double bonds in its hydrocarbon chain and contains a thioalkyl group.

8. A process according to claim 7 characterised in that the sulphur-containing unsaturated cyclic hydrocarbon is a sulphur-containing cyclic olefin with formula

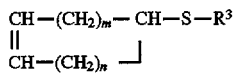

where m and n may be identical or different and are whole numbers from 0 to 15, with m+n other than 0 and other than 3, and $R^3$ is a $C_1$ to $C_{12}$ alkyl group, a $C_2$ to $C_{12}$ alkenyl group or a $C_6$ to $C_{18}$ aryl group.

9. A process according to claim 8 characterised in that m=2, n=3 and $R^3$ is an ethyl, n-butyl, tertiobutyl, hexyl or cyclohexyl group.

10. A process according to claim 2 characterised in that the non-sulphur-containing acyclic olefin used in the cross metathesis reactions has formula $R^4$—CH=CH—$R^5$, where $R^4$ and $R^5$, which are the same or different, represent a hydrogen atom, a $C_1$ to $C_{10}$ alkyl group, a $C_2$ to $C_{10}$ alkenyl group or a $C_6$ to $C_{10}$ aryl group.

11. A process according to claim 10 characterised in that $R^4$ and $R^5$ are simultaneously or independently H, $CH_3$ or $CH_2$—$CH_3$.

12. A process according to claim 2 characterised in that the non-sulphur-containing unsaturated cyclic hydrocarbon used in the cross metathesis reactions contains one to four double bonds and has the formula:

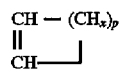

where x=1 or 2 and p is a whole number equal to 2, 3 or 5 to 15; the hydrocarbon may be a polycycle and include a bridge.

13. A process according to claim 12 characterised in that the unsaturated cyclic hydrocarbon is a cyclic olefin, diene, triene or tetraene.

14. A process according to claim 13 characterised in that the unsaturated cyclic hydrocarbon is cyclopentene, cyclooctene, cyclodecene, cyclododecene, cyclooctadiene, cyclododecadiene, cyclododecatriene or cyclooctatetraene.

15. A process according to claim 12 characterised in that the unsaturated cyclic hydrocarbon is a polycyclic olefin or diene.

16. A process according to claim 15 characterised in that the polycyclic unsaturated hydrocarbon is norbornene, norbornadiene or dicyclopentadiene.

17. A process according to claim 1 characterised in that the catalyst is associated with a halide or an organometallic compound of Ga, Al, Sn, Pb, Mg, Li, Ti or B.

* * * * *